(12) United States Patent
Civanlar et al.

(10) Patent No.: US 6,483,832 B1
(45) Date of Patent: Nov. 19, 2002

(54) IP MULTICAST OVER ROUTED ATM NETWORK USING LANE

(75) Inventors: Seyhan Civanlar, Middletown Township, Monmouth County; Don Richard Coffield, Locust; William J. Leighton, III, Scotch Plains, all of NJ (US); Rustom K. Masalawala, New York, NY (US); Vikram R. Saksena, Freehold, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/060,292

(22) Filed: Apr. 14, 1998

(Under 37 CFR 1.47)

Related U.S. Application Data (60) Provisional application No. 60/043,267, filed on Apr. 17, 1997.

(51) Int. Cl.[7] .............................................. H04L 12/28
(52) U.S. Cl. ...................................... 370/390; 370/432
(58) Field of Search ................................ 370/389, 390, 370/392, 395, 400, 401, 408, 432, 395.53

(56) References Cited

U.S. PATENT DOCUMENTS

| | | | | |
|---|---|---|---|---|
| 5,752,003 | A | * 5/1998 | Hart | 370/395 |
| 5,812,552 | A | * 9/1998 | Arora et al. | 370/401 |
| 5,909,441 | A | * 6/1999 | Alexander, Jr. et al. | 370/395 |
| 6,005,864 | A | * 12/1999 | Krause | 370/395 |

FOREIGN PATENT DOCUMENTS

WO   WO 97 02684 A   1/1997   ........... H04L/12/46

OTHER PUBLICATIONS

Troung, Hong Linh, Ellington Jr., William, Le Boudec, Jean–Yves, Meier, Andreas W., and Pace, J. Wyane, "LAN Emulation on an ATM Network", IEEE Communications Magazine, May 1, 1995, pp. 70–85.

(List continued on next page.)

Primary Examiner—Chau Nguyen
Assistant Examiner—Andy Lee (57) ABSTRACT

A method and a system for forwarding multicast data packets across a plurality of telecommunications subnets interconnected by routers in which a data packet is received within a subnet of the plurality of telecommunications subnets. When the data packet is a multicast data packet, a multicast IP address for the multicast data packet is determined. A multicast forwarding database is accessed for determining a LAN Emulation Client associated with the multicast IP address, and a Broadcast Unknown Server associated with the multicast IP address for the multicast data packet is determined. The multicast data packet is sent to the Broadcast Unknown Server associated with the multicast IP address for the multicast data packet through the LAN Emulation Client using a point-to-point connection. The Broadcast Unknown Server sends the multicast data packet inter-subnet to each router associated with the multicast IP address for the multicast data packet using a point-to-multipoint connection, with at least one multicast host being connected to a subnet that is different from the subnet in which the multicast data packet was received.

12 Claims, 7 Drawing Sheets

OTHER PUBLICATIONS

Chen, Xiaoqiang, and Tantiprasut, Duke Thanes, "A Virtual Topology Management Protocol for ATM LAN Emulation", Bell Labs Technical Journal, vol. 2, No. 2, Mar. 21, 1997, pp. 132–150.

Jeffries, R., "ATM Lan Emulation: The Inside Story. The ATM Forum's LAN Emulation Service Makes it Possible to Ship Upper–Layer Protocols Over ATM Connections Without Modifying Legacysoftware", Data Communications, vol. 23, No. 13, Sep. 21, 1994, pp. 95–100.

International Search Report International Application No. PCT/US98/07317.

Norihiro Ishikawa, "An Architecture for Scalable IP Multicast Routing on ATM," Research Report in Information Processing Society of Japan, vol. 96, No. 63, pp. 19–24, Distributed Processing System, 77–4, 94–DPS–77, *Information Processing Society of Japan*, Jul. 12, 1996 (CS–NG–1998–00669–003).

Tsunemi Shitara: "World of 5.3 Mpps Transmission Performance Realized by Routing and ATM Switching," *Computer & Network LAN*, vol. 14, No. 12, pp. 2–12, Ohmsha, Ltd., Dec. 1, 1996 (CS–ND–1998–00899–001).

Norihiro Ishikawa: "IP Multicast Communication on ATM by Multicast Server Method," Research Report in Information Processing Society of Japan, vol. 96, No. 12, Nos. 109–114, Distributed Processing System, 15–19, 96–DPS–74, *Information Processing Society of Japan*, Jan. 26, 1996 (CS–NG–2000–00589–018).

1994 Autumn Convention, *Institute of Electronics, Information, and Communication Engineers*, B–600 (Sep. 5, 1994).

G. Armitage, "Support for Multicast over UNI 3.0/3.1 based ATM Networks," RFC2022 (Network Working Group Request for Comments: 2022), Nov. 1996.

* cited by examiner

IP MULTICAST OVER ROUTED ATM NETWORK USING LANE

REFERENCE TO RELATED APPLICATIONS

This application claims the benefit of U.S. Provisional Application No. 60/043,267, filed Apr. 17, 1997.

BACKGROUND OF THE INVENTION

1. Field of the Invention

The present invention relates to the field of telecommunications. More particularly, the present invention relates to a method and a system for routing Internet Protocol (IP) multicast traffic over Asynchronous Transfer Mode (ATM) networks.

2. Description of the Related Art

Many applications used on the Internet have multiple sources, or senders, and hosts, or receivers, that participate, or interact, with each other. Previously, conventional unicast techniques were used for sending the same data packet to each host of a multicast group over a circuit that was specifically established between a source and the host. A conventional unicast approach for multicasting traffic, however, is wasteful in terms of both bandwidth and circuit resources.

To overcome the drawbacks of using unicast techniques for multicast traffic, techniques and protocols have been developed so that a multicast data packet is sent along a predetermined route of routers, or switches, and replicated at a point closest to a destination host, thereby reducing the amount of multicast traffic. For example, a number of routing protocols have been developed for creating distribution routes between a source and the hosts of a multicast group. Routers and end stations have become "multicast aware" by using multicast protocols such as the Distance Vector Multicast Routing Protocol (DVMRP), the Multicast Open Shortest Path First (MOSPF) protocol and Protocol-Independent Multicast (PIM).

The DVMRP protocol is widely used in the Multicast Backbone (MBONE) and generates a separate distribution tree for each respective source and destination host group. The distribution tree, also referred to as a spanning tree, provides the shortest path from a source to each host in a multicast group. A spanning tree is constructed for a multicast group by the source initially broadcasting, or sending, a message to an adjacent router that is propagated to all other routers in the network so that the message reaches each participating host. The message effectively registers the multicast group with reach router receiving the message. If no members for a registered multicast group are connected to a particular router, the router sends a pruning message to the previously adjacent router so that the router sending the pruning message is removed from the spanning tree. As a result, the spanning tree that is eventually generated provides the shortest path between the source and every host in the network. Periodically, the broadcast and pruning operations are performed for updating the spanning tree. While the DVMRP protocol works well for a densely-distributed multicast group, the overhead processing associated with message broadcasts and maintenance of state information can become expensive for a sparse distribution of hosts across a wide area network.

The MOSPF protocol is a multicast routing protocol that is built on top of the OSPF protocol, thereby providing the ability to create multicast trees having an OSPF routing domain. Each MOSPF router receives information about hosts that are interested in a particular multicast group through an Internet Group Management Protocol (IGMP) registration process. Consequently, all routers in the OSPF domain contain information relating to the complete topology of the network and can construct the optimum path between a source and any other host in the domain. Nevertheless, multicast trees generated using the MOSPF protocol cannot span OSPF domain boundaries. Further, the MOSPF protocol generates significant amounts of overhead routing information that is continuously exchanged between routers in the network so multicast trees spanning large domains do not scale well.

The PIM protocol, developed by the Internet Engineering Task Force (IETF), addresses problems associated with crossing domain boundaries, and is independent of any underlying unicast protocol. The PIM protocol includes a dense mode and a sparse mode. Dense-mode PIM (PIM-DM) is suitable for environments in which many of the different domains, or subnets, contain at least one host participating in a multicast group and in which network bandwidth is not critical. Unlike the DVMRP protocol, the PIM-DM protocol uses a simple technique of sending a data packet arriving at a router to all adjacent downstream routers. The adjacent downstream routers, in turn, send the packet to their respectively adjacent routers. The routing tree is pruned as each router determines whether there are any hosts participating in the multicast group that are connected to the router.

When the hosts in a network are sparsely distributed, the overhead associated with PIM-DM of flooding information through a network becomes too significant and the PIM-SM protocol is used. In PIM-SM, a host that is interested in joining a particular multicast group is responsible for initiating a join operation to join the multicast routing tree associated with the multicast group. A join request is sent from the interested host towards the source of the multicast tree. The join request is propagated toward the source until the request encounters a router that already has a host participating in the desired multicast group. The routing tree is then updated to include all of the routers between the host initiating the join operation and the router where the propagation of the join request terminates.

Figure 1:
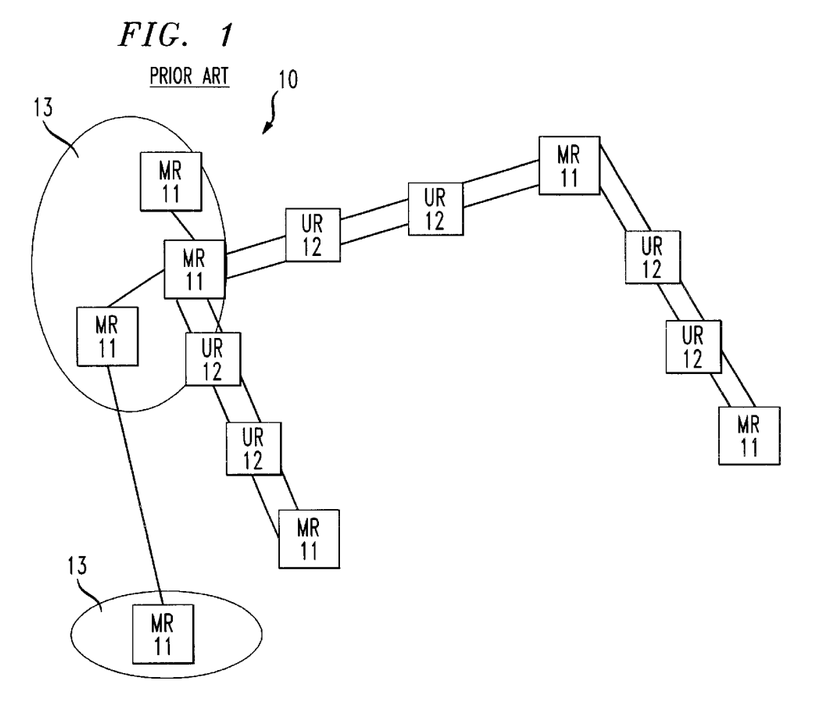
FIG. 1 shows a schematic block diagram of an exemplary conventional MBONE network having a plurality of multicast-aware routers and unicast routers.

Deployment of multicast protocols on routers has proceeded at a steady pace. Nevertheless, there are still so-called "islands" of routers that are multicast-aware that are separated from other islands of multicast-aware routers. FIG. 1 is a schematic block diagram showing an exemplary conventional MBONE network 10 having a plurality of multicast-aware routers 11 and unicast routers 12. A multicast-aware router or a group of multicast-aware routers that are separated from other multicast-aware routers 11 by one or more unicast routers 12 are referred to as islands. In order to transport multicast traffic between multicast-aware routers 11 across one or more unicast routers 12, a technique known as "multicast tunneling" is used. That is, a multicast-aware router 11 encapsulates multicast traffic inside a unicast packet. The encapsulated multicast traffic is then sent, or tunneled, across a portion of the network having unicast routers.

A number of other protocols are under development by the IETF that run on top of conventional routing protocols and which provide the ability for an application to reserve resources in a network so that a specified Quality of Service (QoS) can be achieved. Examples of these particular protocols are the Resource Reservation Protocol (RSVP) and the Real Time Protocol (RTP).

The ATM Forum has developed a specification, known as the LAN Emulation specification (LANE), that permits Legacy LANs- and ATM-connected hosts to communicate across an ATM link without changes to existing applications or software. The LANE specification defines an Emulated Local Area Network (ELAN) environment in which, from the perspective of a legacy application, an ATM network looks appears to be a LAN segment. There are three special entities in a LANE environment that are referred to as a LAN Emulation Server (LES), a Broadcast Unknown Server (BUS) and an LAN Emulation Configuration Server (LECS). The LES registers and resolves ATM addressing by labeling each end station with a Medium Access Control (MAC) layer and an ATM address. The address mapping is used by an ingress LAN Emulation Client (LEC) for setting up a cut-through path to an egress LEC. The BUS is used for distributing broadcast and multicast traffic within the LANE environment.

When a LEC sends a multicast or broadcast packet to other multicast group members within an ELAN, the packet is sent to a BUS. The BUS forwards the packet to all the other LECs within the ELAN environment on a point-to-multipoint virtual channel connection (VCC). An alternative entity to a BUS is a Special Multicast Server (SMS). A LEC wishing to receive data for a multicast address registers with an SMS and is added to the desired multicast group. Traffic received on the SMS for a particular multicast group is forwarded only on the point-to-multipoint circuit for the multicast group, thus preventing other LECs within the ELAN environment from receiving traffic in which they have no interest. While the LANE specification operates with legacy LANs- and ATM-connected hosts, the LANE specification applies only to a single ELAN environment, which, by definition, is a single subnet of an ATM network. A multicast solution in which an ELAN spans different subnet boundaries is not defined under the LANE specification.

Figure 2:
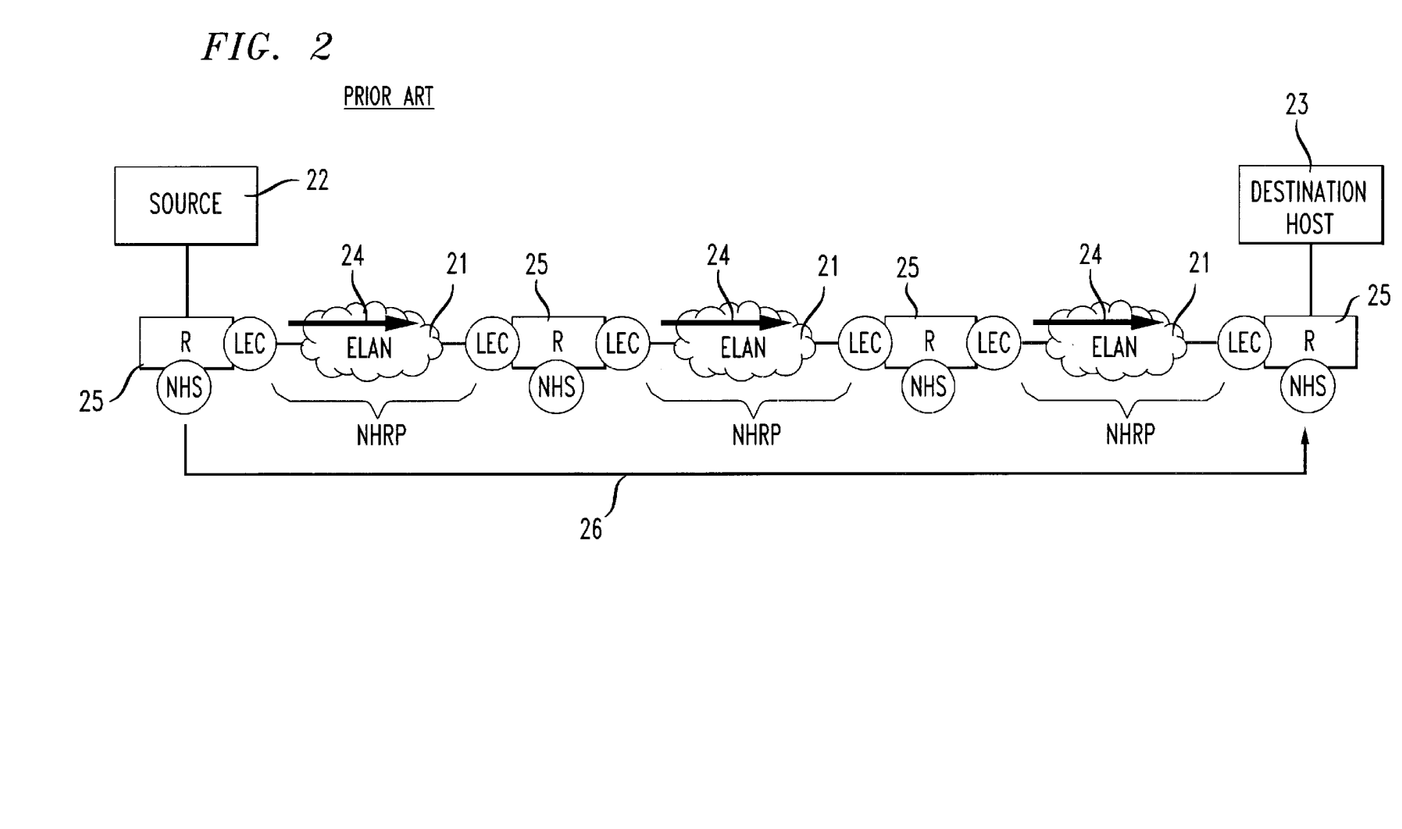
FIG. 2 is a schematic block diagram showing a conventional MPOA implementation traversing a plurality of subnets.

Multiprotocol over ATM (MPOA) is a standard that is built on top of the LANE and the NHRP protocols. The MPOA protocol uses LANE when traffic is confined within a single subnet, but uses the NHRP protocol when traffic crosses subnet boundaries. FIG. 2 is a schematic block diagram showing a conventional MPOA implementation traversing a plurality of subnets 21. As data initially begins to flow from a source 22 to a destination host 23, the data follows a default data path 24 through each subnet 21 using ELAN techniques. At each boundary router 25, the packet is reassembled and Level 3 processing occurs so that the packet can be successfully forwarded to the next subnet 21. While the data packet is traversing default data path 24, a NHRP request is generated for determining the ATM address of destination host 23. Once the ATM destination address information is available, source 22 can set up a direct unicast connection 26 to destination host 23 using NHRP protocol concepts, thereby bypassing all router hops and expensive Level 3 processing.

For each of the conventional IP multicast routing protocols, such as DVMRP, MOSPF, PIM, LANE and MPOA, a considerable amount of state information must be exchanged between routers participating in a multicast. Consequently, overhead traffic, including "join" and "prune" messages, becomes a significant portion of the multicast traffic as a multicast group grows in size. Further, for the DVMRP, MOSPF and PIM protocols, a multicast data packet flows hop-by-hop from one multicast router to the next until the packet reaches its destination. At each hop, Level 3 processing occurs, thereby causing considerable segmentation and reassembly overhead processing. When the LANE and MPOA protocols are used, multicast traffic is confined to an ELAN. Consequently, a host desiring to join a multicast group, but not belonging to a particular ELAN is unable to participate in the multicast session without first becoming a member of the ELAN. This poses a significant problem for dynamically altering membership to a multicast group because a LAN Emulation client (host) can belong to only one ELAN at a time.

What is needed is a way to forward multicast traffic across an ATM network that does not incur significant overhead processing expenses, that scales well, that reduces the number of router hops experienced by a multicast packet when forwarded across the ATM network, and makes efficient use of network resources and network bandwidth.

SUMMARY OF THE INVENTION

The present invention provides multicast traffic forwarding across an ATM network that does not incur significant overhead processing expenses, scales well, reduces the number of router hops experienced by a multicast packet when forwarded across an ATM network, and makes efficient use of network resources and network bandwidth. The advantages of the present invention are provided by a method and a system for forwarding multicast data packets across a plurality of telecommunications subnets interconnected by routers in which a data packet is received within a subnet of the plurality of telecommunications subnets. When the data packet is a multicast data packet, a multicast IP address for the multicast data packet is determined. A multicast forwarding database is accessed for determining a LAN Emulation Client associated with the multicast IP address, and a Broadcast Unknown Server associated with the multicast IP address for the multicast data packet is determined. The multicast data packet is sent to the Broadcast Unknown Server associated with the multicast IP address for the multicast data packet through the LAN Emulation Client using a point-to-point connection. The Broadcast Unknown Server sends the multicast data packet inter-subnet to each router associated with the multicast IP address for the multicast data packet using a point-to-multipoint connection, with at least one multicast host being connected to a subnet that is different from the subnet in which the multicast data packet was received. When the data packet is not a multicast data packet, the data packet is sent to a destination address for the data packet using intra-subnet techniques.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a multicast forwarding method and system that sends multicast data packets across subnets of an Internet-Protocol-routed (IP-routed) ATM network. The present invention only addresses the forwarding aspect of multicasting. A multicast routing protocol, such as the MOSPF, the DVMRP and the PIM protocols, and the Internet Group Management Protocol (IGMP) are required for distributing information relating to multicast group membership to routers connected to an ATM network. These particular protocols run across an ATM network or across other networks to hosts that are connected to a multicast session. The multicast forwarding aspects of these protocols, however, are replaced by multicast forwarding concepts of the present invention.

The present invention dramatically improves multicast forwarding performance over conventional multicast forwarding protocols and systems by reducing the number of router hops experienced by an IP multicast packet that is forwarded across an ATM network to be a maximum of two hops. Thus, the present invention makes more efficient use of LANE-type resources and network bandwidth by only sending multicast traffic for a particular multicast group to routers connected to sources and hosts that are members of the multicast group. A potential virtual circuit (VC) explosion caused by multicast traffic is eliminated by the present invention by using a single point-to-multipoint connection per multicast group, with the added capability of providing a specified Quality of Service (QoS) in accordance with the LANE specification. Scalability is improved and large state tables contained within each router is not required by eliminating the flood-and-prune traffic techniques used by conventional multicast forwarding techniques.

Figure 3:
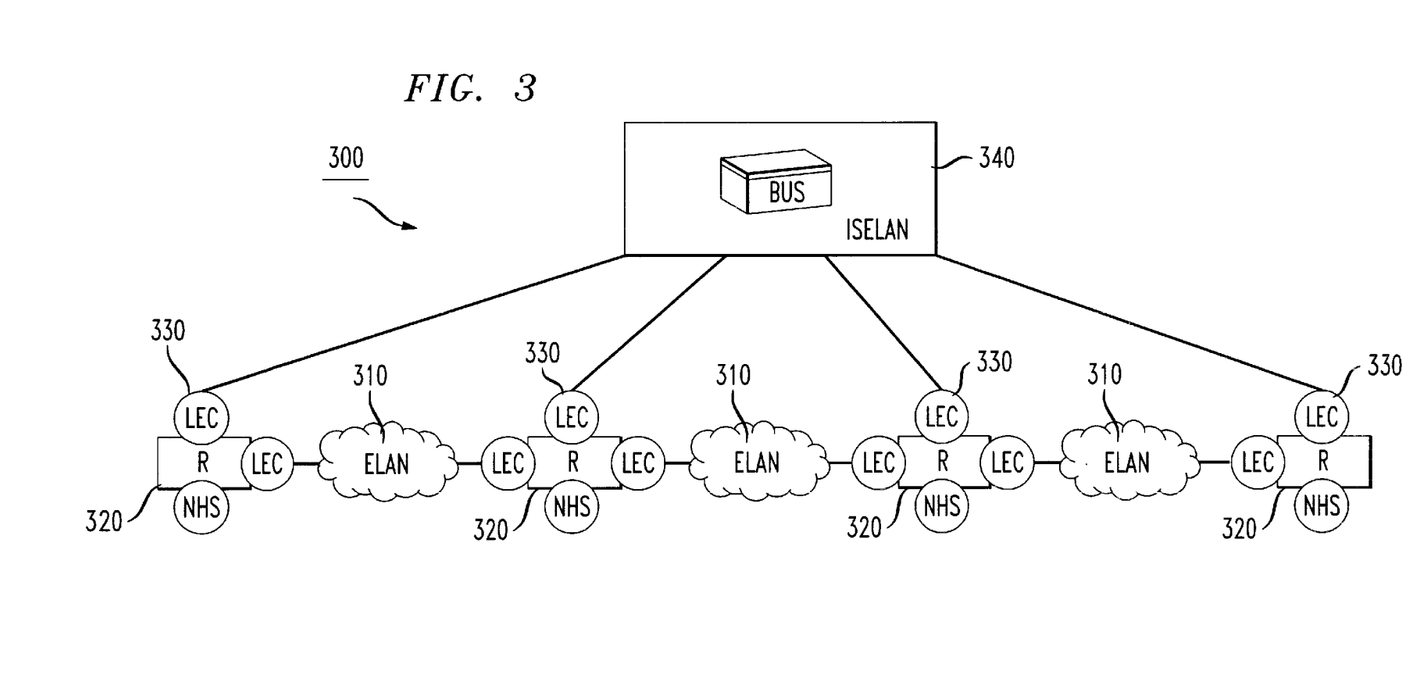
FIG. 3 is a schematic block diagram showing multicast traffic forwarded across subnets according to the present invention.

FIG. 3 conceptually shows a multicast forwarding system (MFS) 300 according to the present invention connected to an IP-routed ATM network having a plurality of subnets 310, of which only three are shown. Subnets 310 are interconnected by a plurality of boundary routers 320. According to the invention, a standards-compliant LAN Emulation Client (LEC) 330 resides on each boundary router 320 having a multicast source or host connected to the router. Routers 320 are all connected to each other through the ATM network and, of course, can have non-ATM interfaces. At least one LES/BUS (not shown in FIG. 3) is connected to each LEC 330 and forms an Inter-Subnet ELAN (ISELAN) 340 that forwards only multicast traffic to routers in the ATM network having members of the same multicast group. A LEC 330 can be dynamically created when a router detects a host desiring to join a multicast group for which no source or other member hosts are connected to the router.

Each router 320 includes a multicast-forwarding table that allows the router to determine to which particular LEC 330 incoming IP multicast traffic should be forwarded to. IP multicast addresses are completely independent from subnet addresses so the sources and hosts of a multicast group can use the same IP multicast address, such as the address range of 224.0.0.0 through 239.255.255.255, across subnets regardless of where the source and the hosts are connected in the ATM network.

Unicast, broadcast and multicast traffic received by a router 320 is segregated. When a received data packet is a multicast data packet, the packet is forwarded by the standards-compliant LEC 330 residing on the router to ISELAN 340. ISELAN 340 then forwards the multicast data packet to each ELAN subnet 310 having a member that is interested in receiving the multicast data packet. In contrast, a conventional ELAN is used only for intra-subnet communications to forward unicast, broadcast and multicast traffic all within a subnet. The unicast and broadcast traffic received by a router 320 are forwarded both intra-subnet and inter-subnet by the router using conventional default mechanisms specifically designed for unicast and broadcast traffic.

Figure 4:
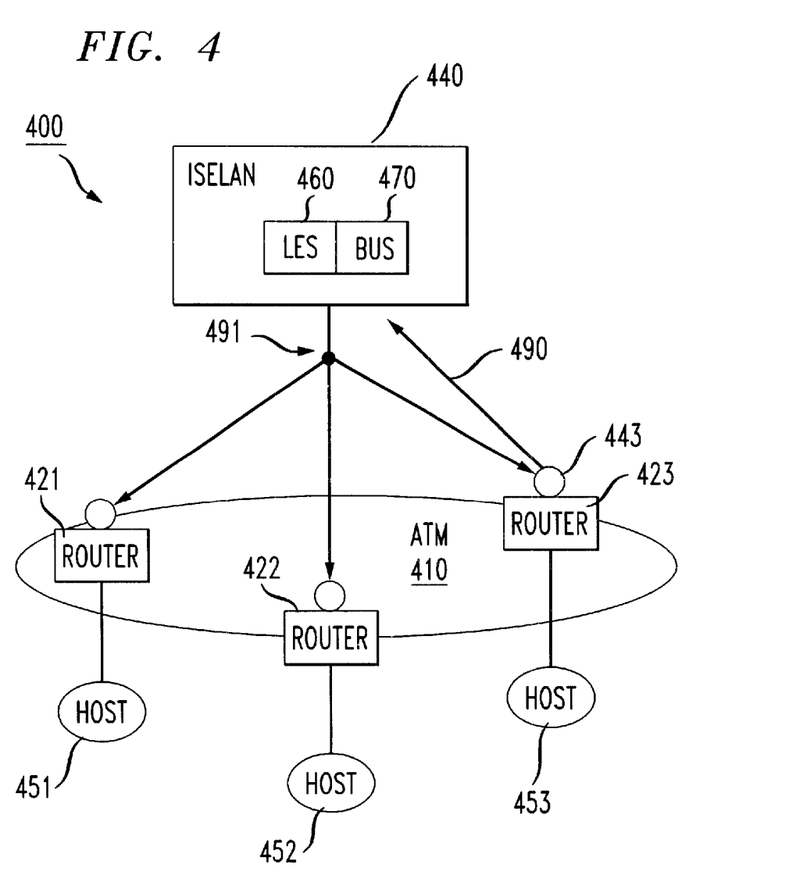
FIG. 4 is a schematic block diagram of a multicast-forwarding system having according to the present invention that includes a static multicast ELAN.

FIG. 4 is a schematic block diagram of an exemplary general configuration of an MFS 400 according to the present invention. In FIG. 4, an ATM network 410 includes routers 421, 422 and 423, which are each preferably a Cascade 9000 router, for example. Hosts 451, 452 and 453 are connected to routers 421, 422 and 423, respectively. When router 423, for example, receives an IP packet from host 453, router 423 first inspects the IP address field of the packet for determining whether the packet is a unicast or a multicast data packet using well-known techniques. When router 423 determines that the packet is a unicast packet, that is, the packet is destined for a single IP destination, router 423 sends the packet through ATM network 410 using conventional unicast routing procedures.

When router 423 determines that the packet is a multicast packet, router 423 inspects the IP multicast address field, which is a class D IP address, and accesses a multicast-forwarding table contained within router 423 for determining whether a LEC entry for the particular class D address has already been created. If an entry exists in the multicast-forwarding table specifying a mapping from the class D address to a specific LEC 433 that resides on router 423, then router 423 encapsulates the packet into an LAN Emulation header using an ATM Forum compliant encapsulation and sends the encapsulated packet to the specified resident LEC 433, for example. If there is no LEC entry in the multicast-forwarding table for the specified class D address, router 423 creates a new LEC and a corresponding new table entry in the multicast-forwarding table for mapping from the class D address to the newly created LEC.

LEC 433 first resolves the destination multicast MAC protocol address, which is generated by router 423 based on the IP multicast class D address contained in the data packet, into an ATM address by sending an address query LE_ARP_Request message to a LES 460 that is resident on an ISELAN 440. LES 460 responds to the address query message by sending a message to LEC 433 containing the address of a broadcast and unknown server (BUS) 470 in accordance with the LANE specification. Alternatively, LES 460 can specify the address of a Special Multicast Server (SMS) (not shown) instead of the address of BUS 470.

Next, LEC 433 sends the encapsulated IP packet to BUS 470 (or SMS 480) over a connection 490. BUS 470 (or SMS 480), in turn, sends the packet to LECs that are associated with the respective destinations of the packet over a point-to-multipoint connection 491 using a well-known technique. The LECs receiving the packet reside on other routers in ATM network 410, such as routers 421 and 422. Each receiving LEC decapsulates the packet, and the router on which the LEC resides accesses a table for determining whether any of the destination hosts, that is, members of the multicast group for the packet, are connected to the router. If there is a receiver for the multicast group of the packet connected to the router, the router sends the IP packet to the appropriate outgoing port(s). Information relating to the hosts for a particular IP multicast group is obtained by a router through an IGMP registration process or a multicast routing protocol, such as the MOSPF protocol or the DVMRP protocol.

Figure 5:
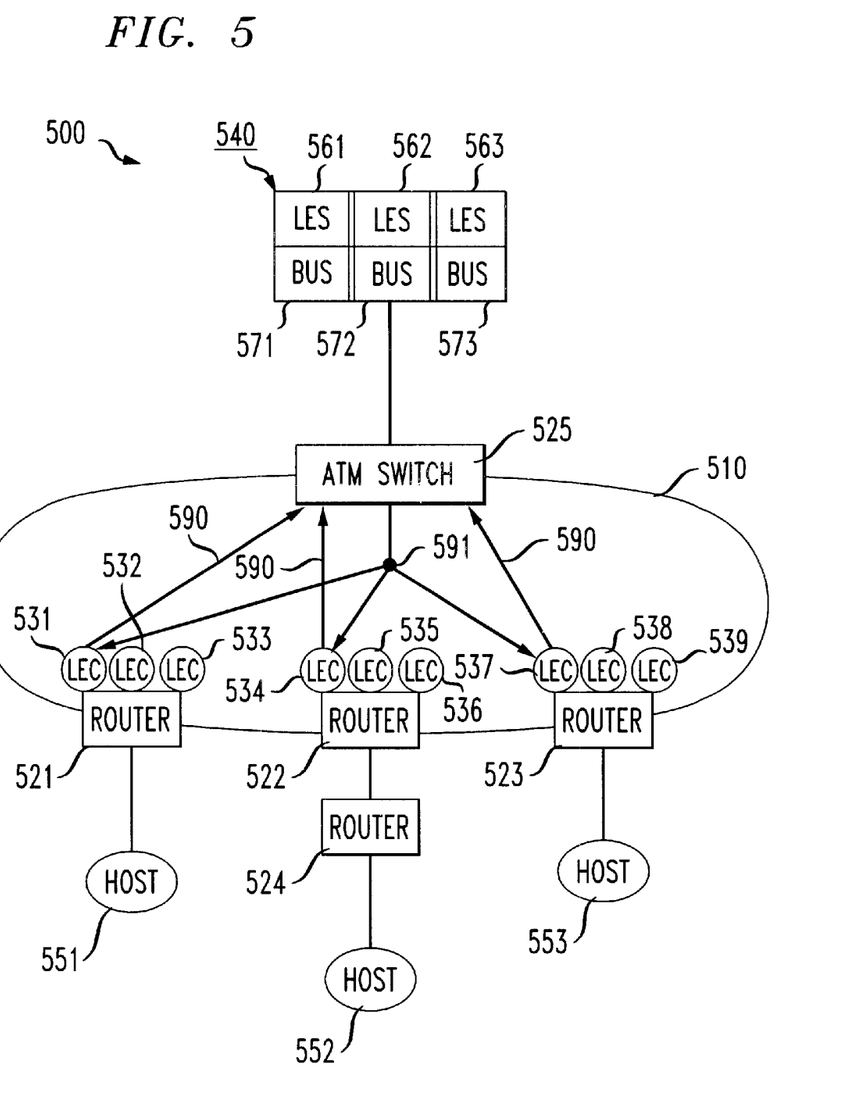
FIG. 5 is a schematic block diagram showing a multicast forwarding system according to the present invention having a static configuration of LECs and ELANs and their respective LES/BUS entities.

FIG. 5 shows another exemplary embodiment a multicast forwarding system 500 according to the present invention having a static configuration of LECs and LES/BUS entities associated with an ISELAN. In FIG. 5, an ATM network 510 includes a plurality of routers, of which only routers 521, 522, 523 and 524 are shown, and an ATM switch 525. A plurality of hosts, of which only hosts 551, 552 and 553 are shown, can be connected to ATM network 510 through a router via, for example, a dial-up line using the Point-to-Point Protocol (PPP), connected to a LAN (not shown) that is connected to a router, by a private line, or through a downstream router, such as router 524. Different host connection alternatives are viable.

ATM switch 525 includes ISELAN 540 having a predetermined number of preconfigured LES/BUS entities, with each BUS being designated for a particular range of multicast IP addresses and is scalable within the expected traffic for the designated address range. For clarity, only three LES/BUS entities are shown. ISELAN 541 includes an LES/BUS entity formed by an LES 561 and a BUS 571. Similarly, ISELAN 542 includes a LES 562 and a BUS 572, and ISELAN 543 includes a LES 563 and a BUS 573. All LESs and BUSs can reside on the same physical device or can be distributed across multiple devices. Similarly, a predetermined number of LECs corresponding to each BUS are preconfigured on each router. The multicast IP address ranges and the correspondence QoS for each address range are made available in a well-known manner, such as an Internet web-page, so that sources can select from available multicast IP addresses.

A point-to-multipoint connection 591 connects BUS 571 to LECs 531, 534 and 537. Connection 591 is unidirectional in that BUS 571 is a source and each LEC is a leaf. Each of LECs 531, 534 and 527 also connect to BUS 571 with a point-to-point connection 590 so that packets can be forwarded to BUS 571. Similarly, each of the LESs 561, 562 and 563 are connected to specific LECs using both point-to-multipoint and point-to-point connections that are not shown in FIG. 5, are well-defined by ATM Forum LAN Emulation specification.

Router 521, for example, receives an IP packet from host 551 that is destined to an IP multicast address, such as 225.0.1.0. Router 521 inspects the packet in a well-known manner and determines that the destination address is an IP multicast address. Router 521 accesses the multicast-forwarding table contained within router 521 for determining which LEC residing on router 521 is designated for supporting the class D address of the multicast packet. An exemplary multicast-forwarding table contained in router 521 is shown in Table 1.

TABLE 1

| IP multicast address | Destination address |
|---|---|
| 224.0.0.0 - 225.0.1.0 | LEC 531 |
| 225.0.1.1 - 230.0.8.0 | LEC 532 |
| 230.0.8.1 - 239.255.255.255 | LEC 533 |

Based on the exemplary entries in Table I, the IP packet is sent to LEC 531. Upon receipt of the packet, LEC 531 resolves the ATM address of the BUS by sending an address resolution query (LE_ARP_REQUEST) message to a LES 561 for the broadcast group address. In response, LES 561 returns the ATM address of the destination LEC. LEC 531 forwards the multicast packet to BUS 571 on connection 590. BUS 571, in turn, forwards the packet using connection 591 to LECs 531, 534 and 537. LEC 531 discards the packet to prevent looping. LEC 534 residing on router 522 receives and forwards the packet to the Layer-3 processor residing on router 522. Router 522 determines whether there is a host attached to any of the non-ATM ports connected to router 522 that should receive the packet. If so, router 522 forwards the packet to port 593, for example, so that host 552 can receive the packet. If there are no hosts connected to router 522 that should receive the packet, the packet is discarded.

In another implementation of a multicast forwarding system according to the present invention, each router can dynamically create LECs dynamically when there are either new hosts explicitly joining a multicast group, or new sources sending multicast packets to a multicast group. Explicitly joining members become known to a router because a host that is interested in joining a multicast group sends an IGMP packet to the router to which the host is directly connected informing the router of the interest in receiving multicast packets addressed to a specific address. In response, the router informs adjacent router(s) of the new member host by sending multicast routing update messages using well-known protocols indicating that there is interest in receiving multicast packets at a particular multicast address. As previously mentioned, each router learns which multicast addresses are of interest using an IGMP registration process.

Figure 6:
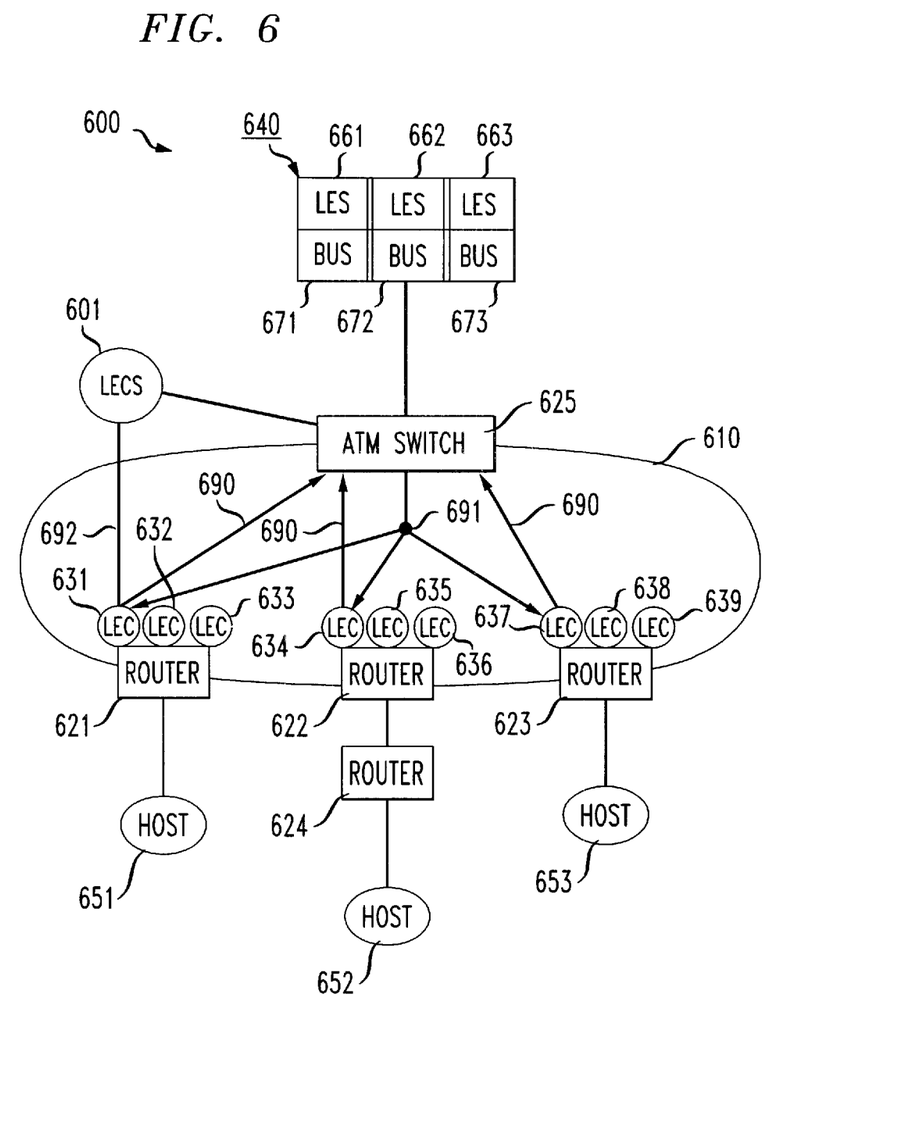
FIG. 6 is a schematic block diagram showing a multicast forwarding system according to the present invention that can be dynamically reconfigured using an LECS for creating LECs and LES/BUS entities within an ISELAN.

FIG. 6 is a schematic block diagram showing a multicast forwarding system 600 according to the present invention that can be dynamically reconfigured using an LECS for creating LECs and LES/BUS entities within an ISELAN. FIG. 6 has basically the same system topology as MFS 500 shown in FIG. 5. For clarity, only three LES/BUS entities are shown. In FIG. 6, an ATM network 610 includes a plurality of routers, of which only routers 621, 622, 623 and 624 are shown, and an ATM switch 625. A plurality of hosts, of which only hosts 651, 652 and 653 are shown, can be connected to ATM network 610 through a router via, for example, a dial-up line using the Point-to-Point Protocol using a variety of different techniques. ATM switch 625 includes ISELAN 640. For clarity, only three LES/BUS entities are shown. ISELAN 641 includes an LES/BUS entity formed by an LES 661 and a BUS 671. Similarly, ISELAN 642 includes a LES 662 and a BUS 672, and ISELAN 643 includes a LES 663 and a BUS 673.

A point-to-multipoint connection 691 connects BUS 671 to LECs 631, 634 and 637. Each of LECs 631, 634 and 627 also connect to BUS 671 with a point-to-point connection 690 so that packets can be forwarded to BUS 671. Similarly, each of the LESs 661, 662 and 663 are connected to specific LECs using both point-to-multipoint and point-to-point connections that are not shown in FIG. 6, are well-defined by ATM Forum LAN Emulation specification.

In FIG. 6, a router 621, for example, receives an IP packet from a host 651, for example, that is either directly connected to router 621 or connected to a downstream router (not shown) that is connected to router 621. Using well-known techniques, router 621 determines whether the destination address of the packet is an IP multicast address. Router 621 accesses the multicast forwarding table contained in router 621 for determining whether there is an LEC residing on router 621 that has already been created for forwarding the packet. When such an entry does not exist in the multicast forwarding table, router 621 creates a new entry in the multicast forwarding table, such as line 1 of Table 2, that provides a new LEC assignment for the multicast address, such as 225.0.1.0, contained in the packet. Router 621 then creates a new LEC that is resident on router 621.

In most cases, an entry will have already been created by a LECS 601 or as a result of a previously-received IP packet having the same destination address. When an entry for the IP address exists, router 621 reads the destination address from the table. An exemplary dynamically-created multicast forwarding table contained in router 621 is shown in Table 2.

TABLE 2

| IP Multicast Address | Destination Address |
|---|---|
| 225.0.1.0 | LEC 631 |
| 226.1.0.9 | LEC 632 |
| 228.128.0.8 | LEC 633 |

When LEC 631 is a newly-created LEC, LEC 631 connects to a LECS 601, via connection 692, for determining which LES/BUS to connect to. LECS 601 performs a table look-up to determine whether a LES/BUS entity has already been created for the multicast address contained in the data packet. When there is a table entry already created, LECS 601 returns the ATM address of the already-created LES, for example, LES 661. Otherwise, LECS 601 creates a new table entry by selecting one of the available, but unused, LESs residing within ISELAN 640 for the new multicast group, activates the selected LES, and returns the ATM address for the selected LES, such as LES 661, to LEC 631. An exemplary LECS table contained in LECS 601 is shown in Table 3.

TABLE 3

| Multicast Address | LES ATM Address |
|---|---|
| 225.0.1.0 | 47.00.10 . . . 1 (LES 661) |
| 226.1.3.4 | 47.00.10 . . . 2 (LES 662) |
| 229.67.0.1 | 47.00.10 . . . 3 (LES 663) |

Subsequently, LEC 631 connects to LES 661 and BUS 671. LEC 631 resolves the MAC address of the destination multicast address for the multicast ATM address by sending an address resolution query (LE_ARP_REQUEST) message to LES 661. In response, LES 661 returns the ATM address for BUS 671. LEC 631 forwards the multicast packet to BUS 671 on connection 690. BUS 671, in turn, forwards the packet to LECs 631, 634 and 637 using connection 691. LEC 631 discards the packet to prevent looping.

LEC 634 on router 622 receives and forwards the packet to the Layer-3 processor residing on router 622. Router 622 determines whether there is a host attached to any of its non-ATM ports that has an interest in receiving the packet. If there is no interested host, router 622 discards the packet. Otherwise, router 622 forwards the packet to those port to which interested hosts are connected.

The dynamic approach of the present invention allows LECs and LES/BUS entity resources to be allocated to each multicast group when a session manager builds an ISELAN or when data starts flowing. Thus, there are no dedicated ISELAN resources allocated, but unused, as with the static configuration of LECs and LES/BUS entities of the present invention, as shown in FIG. 5.

Figure 7:
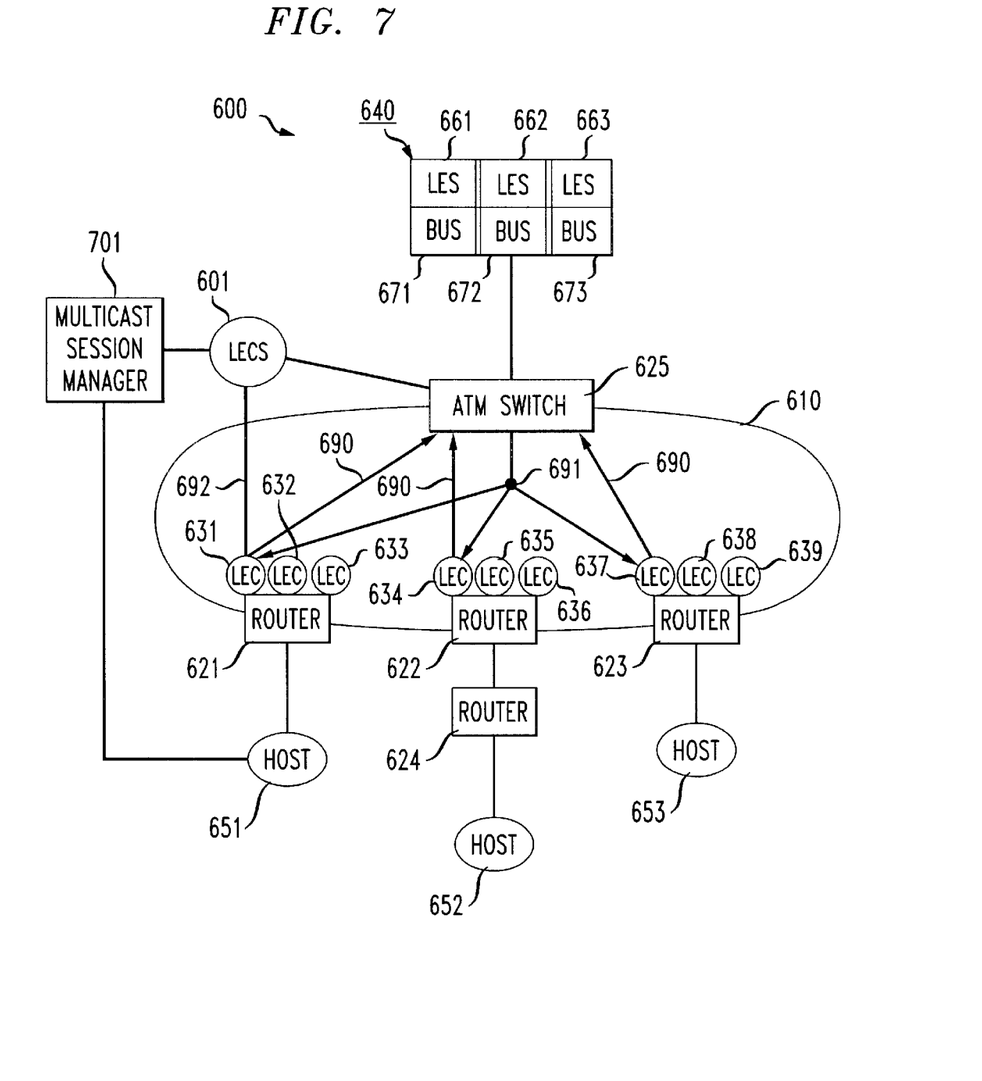
FIG. 7 is a schematic block diagram showing a multicast forwarding system according to the present invention that can be dynamically reconfigured using a Session Manager for creating LECs and LES/BUS entities within an ISELAN.

While "dynamic" multicast forwarding system 600 overcomes some of the drawbacks of the "static" multicast forwarding system, shown in FIG. 5, system 600 does not provide any technique for tightly-controlled multicast groups, that is, an application triggered multicast group in which only eligible hosts can join a multicast group. FIG. 7 is a schematic block diagram showing a multicast forwarding system 700 according to the present invention that can be dynamically reconfigured using a Session Manager for creating LECs and LES/BUS entities within an ISELAN. FIG. 7 has basically the same system topology as MFS 600 shown in FIG. 6.

In FIG. 7, host 651, for example, initially accesses a web-based multicast session manager 701 for joining a particular multicast group. Session manager 701 authenticates the user at host 651 and then provides a screen that permits existing and registered multicast sessions to be viewed, as well as the ability to create a new multicast session. A variety of additional filters or parameters, such as start time, bandwidth required, closed user groups, etc., can also be specified through interface provided by the web-based multicast session manager. The values entered for parameters, such as bandwidth and cell delay variation, are used in setting up a circuit having a specified Quality of Service. Once the entries are complete, they are entered into a database on session manager 701.

Session manager 701 is responsible for monitoring the start of a multicast session and registration of participants. In order to build an ISELAN for a multicast session, the steps that have been previously outlined for dynamically creating an ISELAN must be performed. When the session actually begins and the traffic begins to flow through the routers, the entire ISELAN will be setup and engaged.

In addition to creating the Multicast ELANs, Session Manager 701 also has the responsibility of removing a LEC from a router when a host that was interested in a multicast session decides to drop out of the group, leaving no interested hosts connected to the router or downstream from the router. Lastly, when an entire multicast session is over, the LES/BUS entity and all the LECs that were a part of the session are removed and the resources made available for other multicast sessions.

While the present invention has been described in connection with the illustrated embodiments, it will be appreciated and understood that modifications may be made without departing from the true spirit and scope of the invention.

What is claimed is:

1. A method of forwarding multicast data packets across a plurality of telecommunications subnets interconnected by routers, the method comprising the steps of:

providing a multicast-forwarding table at each router;
   receiving a multicast data packet within a subnet of the plurality of telecommunications subnets;
   determining a multicast IP address for the multicast data packet, wherein the multicast IP address is provided from the multicast-forwarding table of the router that receives the multicast data packet;
   determining a Broadcast Unknown Server associated with the multicast IP address for the multicast data packet;
   sending the multicast data packet to the Broadcast Unknown Server associated with the multicast IP address for the multicast data packet using a point-to-point connection;

sending the multicast data packet over an inter-subnet connection from the Broadcast Unknown Server to each router associated with the multicast IP address for the multicast data packet using a point-to-point multipoint connection, at least one multicast host being connected to a subnet that is different from the subnet in which the multicast data packet was received.

2. The method according to claim 1, wherein the step of receiving the multicast data packet includes the steps of:

receiving a data packet;

determining whether the data packet is a multicast data packet; and sending the data packet to a destination address for the data packet using an intra-subnet technique when the data packet is determined to not be a multicast data packet.

3. The method according to claim 1, wherein the step of sending the multicast data packet to a Broadcast Unknown Server includes the steps of:

accessing a multicast forwarding database for determining a LAN Emulation Client associated with the multicast IP address; and sending the multicast data packet to the Broadcast Unknown Server through the LAN Emulation Client when the multicast forwarding database includes information associating the multicast IP address with the LAN Emulation Client.

4. The method according to claim 3, wherein the multicast forwarding database associates a range of multicast IP addresses with the LAN Emulation Client.

5. The method according to claim 3, wherein when the multicast forwarding database does not include information associating the multicast IP address, the method further comprises the steps of:

creating a LAN Emulation Client for the multicast IP address; and associating the LAN Emulation Client with the multicast IP address in the multicast forwarding database.

6. The method according to claim 5, wherein when no Broadcast Unknown Server is associated with the multicast IP address of the multicast data packet, the method further includes the step of creating a Broadcast Unknown Server for the multicast IP address.

7. The method according to claim 5, further comprising the steps of:

creating a multicast group having the multicast IP address; and creating a LAN Emulation Server for the multicast IP address.

8. A multicast forwarding system for forwarding multicast data packets across a plurality of telecommunication subnets, the system comprising:

a Broadcast Unknown Server associated with a multicast IP address; and a router, having a multicast-forwarding table, connected to a subnet of telecommunications subnets, the router receiving a multicast data packet having a multicast IP address, wherein the multicast IP address is provided from the multicast-forwarding table of the router that receives the multicast data packet and sending the multicast data packet to the Broadcast Unknown Server, the Broadcast Unknown Server sending the multicast data packet over an inter-subnet connection to each router associated with the multicast IP address for the multicast data packet using a point-to-point multipoint connection, at least one multicast host being connected to a subnet that is different from the subnet from which the multicast data packet was received.

9. The system according to claim 8, wherein the router receives a data packet and determines whether the data packet is a multicast data packet, the router sending the data packet to a destination address of the data packet using an intra-subnet technique when the data packet is determined to not be a multicast data packet.

10. The system according to claim 8, wherein the router includes a multicast forwarding database containing information relating to a LAN Emulation Client associated with the multicast IP address of the multicast data packet, the router accesses the multicast forwarding database in response to receiving the multicast data packet for determining the LAN Emulation Client associated with the multicast IP address of the multicast data packet, and wherein the multicast data packet is sent to the Broadcast Unknown Server through the LAN Emulation Client when the multicast forwarding database includes information associating the multicast IP address with the LAN Emulation Client.

11. The system according to claim 10, wherein the multicast forwarding database associates a range of multicast IP addresses with the LAN Emulation Client.

12. The system according to claim 10, wherein when the multicast forwarding database in the router does not include information associating the multicast IP address the router creates a LAN Emulation Client for the multicast IP address, and associates the LAN Emulation Client with the multicast IP address in the multicast forwarding database.

* * * * *